(12) United States Patent
Hanson et al.

(10) Patent No.: US 7,713,425 B2
(45) Date of Patent: May 11, 2010

(54) OIL MANAGEMENT SYSTEM

(75) Inventors: Todd Hanson, Waxhaw, NC (US); Gary B. Zulauf, Findlay, OH (US)

(73) Assignee: Honeywell International Inc., Morristown, NJ (US)

( * ) Notice: Subject to any disclaimer, the term of this patent is extended or adjusted under 35 U.S.C. 154(b) by 1043 days.

(21) Appl. No.: 11/127,871

(22) Filed: May 11, 2005

(65) Prior Publication Data

US 2006/0254986 A1  Nov. 16, 2006

(51) Int. Cl.
 *B01D 35/00* (2006.01)
(52) U.S. Cl. .................. 210/739; 210/85; 210/171; 210/209; 184/1.5
(58) Field of Classification Search .............. 210/739, 210/209, 85, 171; 435/6; 73/649, 53.01, 73/53.05
See application file for complete search history.

(56) References Cited

U.S. PATENT DOCUMENTS

| | | | | |
|---|---|---|---|---|
| 4,782,332 | A | 11/1988 | Cipris et al. ................ 340/603 |
| 4,792,791 | A | 12/1988 | Cipris et al. ................ 340/603 |
| 5,274,335 | A | 12/1993 | Wang et al. ................. 324/689 |
| 5,301,643 | A | 4/1994 | Garcyalny ............... 123/198 D |
| 5,336,396 | A | 8/1994 | Shetley ........................ 210/90 |
| 5,878,708 | A | 3/1999 | Ruman ................... 123/196 M |
| 5,948,344 | A * | 9/1999 | Cusick et al. ............... 264/510 |
| 6,238,554 | B1 * | 5/2001 | Martin et al. ............... 210/109 |
| 6,508,100 | B2 | 1/2003 | Berndorfer .................. 73/1.02 |
| 6,557,396 | B2 | 5/2003 | Ismail et al. ................ 73/53.05 |
| 6,572,768 | B1 | 6/2003 | Cline et al. ................. 210/236 |
| 6,776,024 | B2 | 8/2004 | Jakoby ........................... 73/10 |
| 6,786,080 | B2 | 9/2004 | Jakoby et al. .............. 73/54.01 |
| 6,790,356 | B2 | 9/2004 | Wright et al. ............... 210/248 |
| 6,799,458 | B2 | 10/2004 | Ismail et al. ............... 73/304 C |
| 6,835,305 | B1 | 12/2004 | Baumann et al. ............ 210/133 |
| 2002/0158003 | A1 | 10/2002 | Cousineau et al. |
| 2003/0046985 | A1 | 3/2003 | Schoess |
| 2003/0047517 | A1* | 3/2003 | Schoess ...................... 210/741 |

(Continued)

FOREIGN PATENT DOCUMENTS

DE     10245271 A1     1/2004

(Continued)

OTHER PUBLICATIONS

U.S. Appl. No. 60/615,481.*

*Primary Examiner*—Walter D Griffin
*Assistant Examiner*—Cameron J Allen

(57) ABSTRACT

An oil management system and oil filter utilized in association with an internal combustion engine. The oil filter comprises high-efficiency filtration media for filtering engine oil associated with the internal combustion engine. At least one type of time release additive can be impregnated into the filtration media, wherein the time release additives are automatically released into the engine oil filter from filtration media in order to replenish additives already present in the engine oil. Additionally, a sensor module can be provided that monitors oil quality and oil filter efficiency through detecting one or more attributes of the engine oil filtered through the filtration media of oil filter in order to efficiently conserve and manage the oil and reduce the interval of oil changes thereof by extending the life of the engine oil through the replenishment of the additives present in the engine oil and higher filtration effectiveness of the filter.

18 Claims, 9 Drawing Sheets

U.S. PATENT DOCUMENTS

| | | | | |
|---|---|---|---|---|
| 2003/0193390 A1* | 10/2003 | Muramatsu | ............ | 340/426.13 |
| 2004/0035095 A1* | 2/2004 | Healey | ........................ | 55/486 |
| 2004/0035398 A1 | 2/2004 | Klugl et al. | ................. | 123/456 |
| 2004/0038014 A1* | 2/2004 | Schaefer et al. | ............. | 428/220 |
| 2004/0079589 A1* | 4/2004 | Schneider | ................... | 184/1.5 |
| 2004/0148102 A1* | 7/2004 | McCarthy et al. | ........... | 701/213 |
| 2004/0211470 A1* | 10/2004 | Apostolides | ........... | 137/565.11 |
| 2004/0238419 A1* | 12/2004 | Dohnal et al. | ................. | 210/87 |
| 2004/0257094 A1* | 12/2004 | Halalay et al. | .............. | 324/698 |
| 2005/0173325 A1* | 8/2005 | Klein et al. | ................. | 210/206 |
| 2006/0070364 A1* | 4/2006 | Reamsnyder et al. | ......... | 55/484 |

FOREIGN PATENT DOCUMENTS

| | | |
|---|---|---|
| WO | WO 00/56574 A | 9/2000 |
| WO | WO 2004/020070 A1 | 11/2004 |

\* cited by examiner

OIL MANAGEMENT SYSTEM

TECHNICAL FIELD

Embodiments are generally related to sensor systems and devices. Embodiments are also related to oil filters utilized in internal combustion engines. Embodiments are additionally related to techniques for monitoring oil usage and quality and reducing the frequency of oil changes thereof.

BACKGROUND OF THE INVENTION

A typical oil change for modern cars or light trucks includes both draining the oil and replacing the filter every 3,000 to 7,000 miles. It is estimated in the U.S., alone, that over 1 billion gallons of engine oil annually are changed in the passenger car/light truck segment every year. An additional 250 Million gallons of oil are consumed in the commercial truck market segment.

There is a growing need to minimize the flow of unregulated waste oil in the environment. Extending the useful life of engine lubricating oil can significantly reduce contamination of the air and ground water (through evaporation and landfill seepage, respectively). Also, a reduction in engine oil consumption can help to lessen our dependence on foreign oil.

Modern cars, trucks and other transportation vehicles are designed for unprecedented life and reduced maintenance. Fewer components associated with the car/truck require regular replacement. For example, spark plugs and engine coolant now last 100,000 miles or more. Exhaust systems last the life of the vehicle. The chassis no longer requires lubrication. As a result, the ongoing cost of vehicle ownership is going down. This trend will continue. The reduced cost of vehicle ownership is especially important in the heavy-duty truck and off-highway market segments. Initial vehicle investment, reliability, and vehicle up time all contribute to company profitability. Therefore, reduced maintenance costs and more vehicle time on the road are very attractive to a fleet management company. In summary, extended oil change intervals are good for both profitability and the environment.

BRIEF SUMMARY OF THE INVENTION

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is, therefore, one aspect of the embodiments to provide for improved sensing systems and devices.

It is another aspect of the embodiments to provide for an oil management system utilized in internal combustion engines.

It is a further aspect of the embodiments to provide a system for monitoring oil quality and oil filter effectiveness thus reducing the frequency of oil changes thereof.

The aforementioned aspects and other objectives and advantages can now be achieved as described herein. An oil management system is disclosed, which includes an oil filter utilized in association with an internal combustion engine. The oil filter comprises filtration media for filtering engine oil associated with the internal combustion engine. One or more types of time-release additives can be impregnated into the filtration media. The time release additives are automatically released into the engine oil filter from the filtration media in order to replenish additives already present in the engine oil.

Additionally, a sensor module can be provided that communicates with the oil filter and detects one or more attributes of the engine oil filtered through the filtration media of oil filter in order to efficiently conserve and manage the oil and reduce the interval of oil changes thereof by extending the life of the engine oil through the replenishment of the additives present in the engine oil. A housing (e.g., canister) can be provided for maintaining the oil filter. The sensor module is located preferably, but not exclusively within the oil filter housing. The sensor module can continuously or periodically monitor the oil in order to measure multiple parameters of oil quality and/or oil filter condition. The filter can be configured from high efficiency filtration media, such as, for example, nano-fiber based filtration media. Power to the sensor module can be capacitive or wired.

Additionally, a wireless module can be associated with and in communication with the sensor module to permit sensor data compiled by the sensor module to be transmitted wirelessly to a receiver. A monitoring device can be utilized, which monitors data transmitted wirelessly from the sensor module. The monitoring device is associated with the receiver and comprises a memory for maintaining the data transmitted wirelessly from the sensor module. Additionally, a GPS device can be associated with and/or integrated with the monitoring device, wherein the GPS device permits the data stored within the memory of the monitoring device to be polled or up-linked.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment and are not intended to limit the scope thereof.

Figure 1:
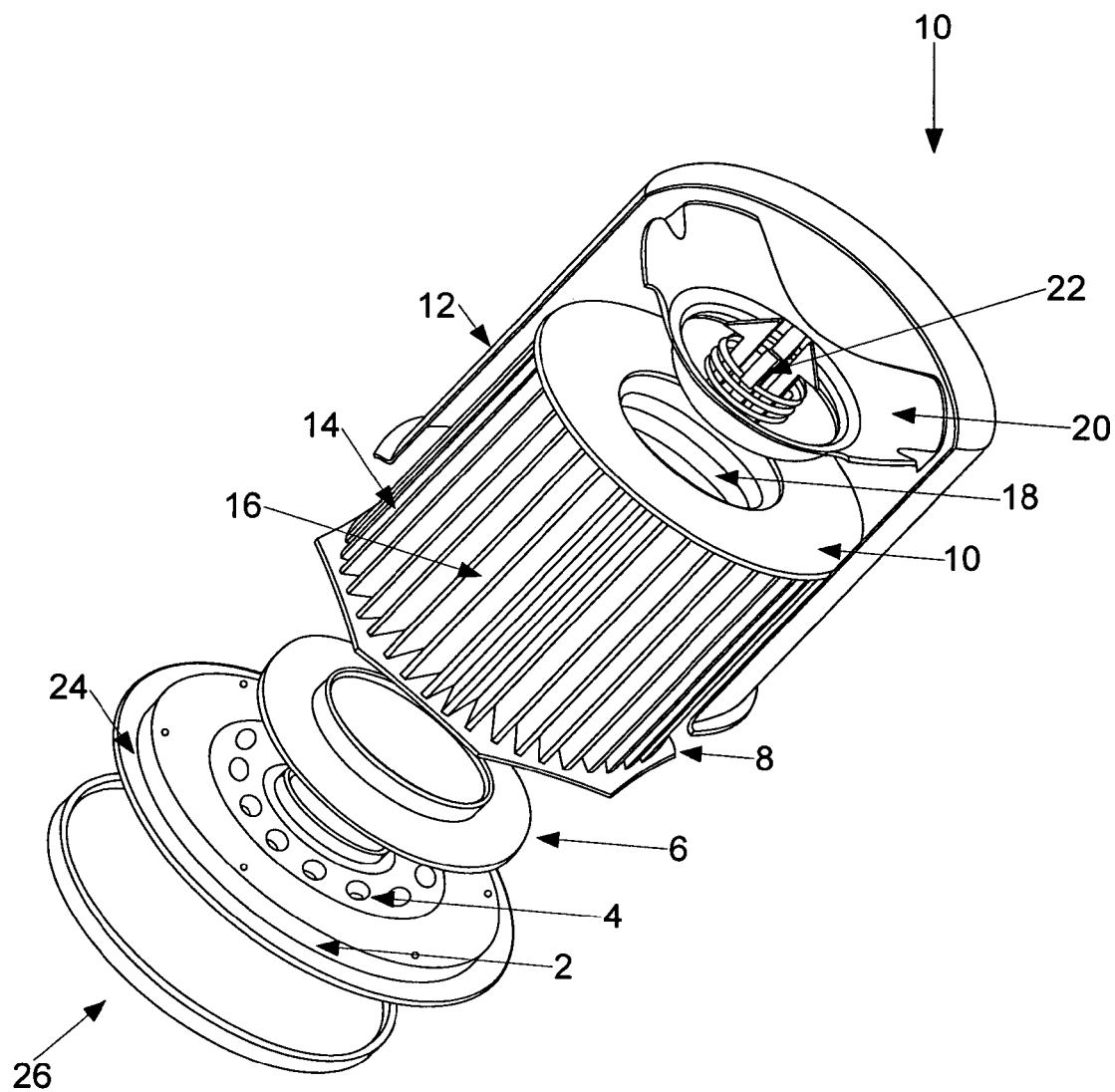
FIG. 1 illustrates an exploded view of an example oil filter apparatus that can be adapted for use in accordance with an embodiment.

FIG. 1 illustrates an exploded view of an example oil filter apparatus 10 that can be adapted for use in accordance with an embodiment. Note that the oil filter apparatus 10 depicted in FIG. 1 is described herein for illustrative purposes only and is not considered a limiting feature of the embodiments. Instead, oil filter apparatus 10 is provided in order to depict the context in which one embodiment can be implemented. The embodiment of FIG. 1 is therefore provided for exemplary and edification purposes only and may be modified or varied, depending upon design considerations. The embodiments disclosed herein can be implemented in the context of a wide variety of automotive systems, such as, for example, heavy duty trucks, tractor trailers, conventional automobiles, and so forth.

The example oil filter apparatus 10 depicted in FIG. 1 can incorporate a housing 12, which may be formed as a steel filter body covered, for example, by an epoxy powder paint. An oil filter 16 can be provided in the form of a filter cartridge. Oil filter 16 is generally composed of filtration media 14, which can be implemented, for example, in the form of pleated filter media. The filtration media 14 is preferably implemented as high-efficiency filtration media (i.e., filtration media that is at least 95% efficient at 5 microns and above).

Oil filter 16 is maintained within housing 12 below a retainer 20 and a relief valve 22. A center tube 18 is centrally located within oil filter 16. End disks 8 and 10 can also be provided to provide additional strength and stability to oil filter 16 within housing 12. An anti-drain valve 6 can be located below oil filter 16 and adjacent to a tapping plate 4 formed from a bottom assembly 2 and located immediately above a bottom portion 24. An external gasket 26 can be configured below bottom assembly 2.

Figure 2A:
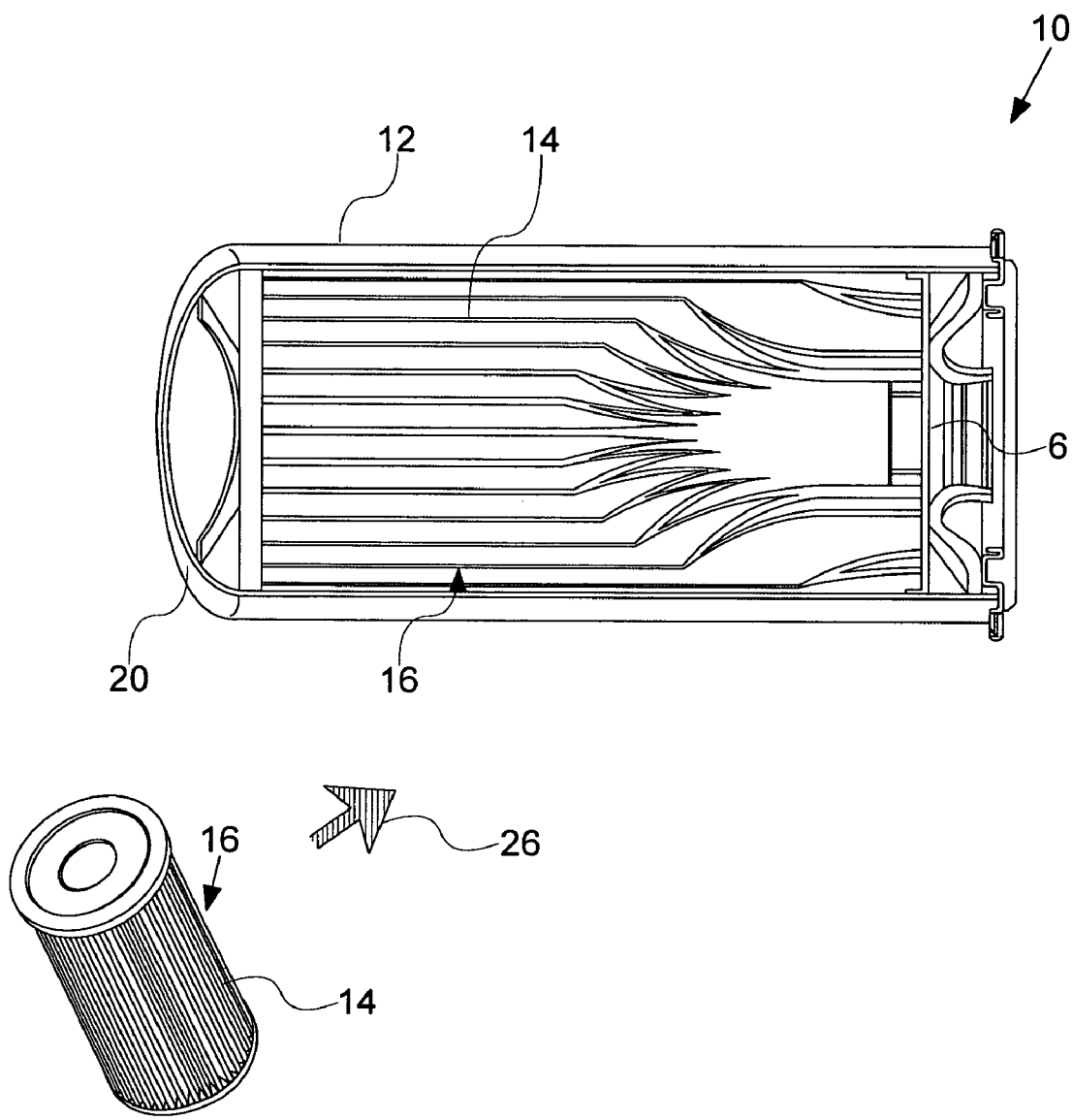
FIG. 2(a) illustrates a side view of the oil filter apparatus depicted in FIG. 1.
Figure 2B:
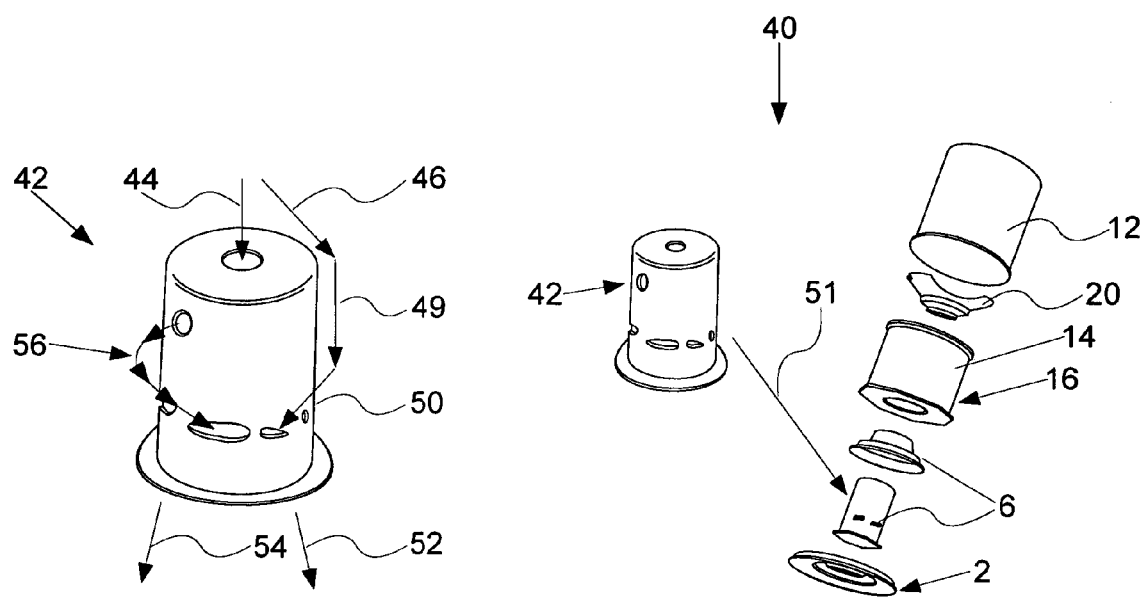
FIG. 2(b) illustrates a general pictorial diagram illustrating the flow of oil filtration and an oil filter basket arrangement, which may be implemented in accordance with the oil filter apparatus depicted in FIGS. 1 and 2(a)

FIG. 2(a) illustrates a side view of the oil filter apparatus 10 depicted in FIG. 1. FIG. 2(b), on the other hand, illustrates a general pictorial diagram illustrating the flow of oil filtration and an alternative oil filter basket arrangement, which may be implemented in accordance with the oil filter apparatus depicted in FIGS. 1 and 2(a). Note that in FIGS. 1, 2(a) and 2(b), identical or similar parts or elements are generally indicated by identical reference numerals. Thus, oil filter 16 with filtration media 14 is depicted in FIG. 2(a).

In FIG. 2(a), arrow 26 indicates that oil filter 16 can be located and maintained within oil filter apparatus 10. In FIG. 2(b), an alternative embodiment is disclosed. Oil filter 16 can be modified for placement within a basket 42 and housed within an oil filter apparatus 40 that includes elements that were depicted in FIG. 1. Arrow 51 indicates the placement of basket 42 within oil filter apparatus 40. Arrows 44, 46, 49, and 50 indicate the general flow of filtered oil in association with the functioning of oil filter 16. Arrows 56, 54, and 52 generally indicate the flow of additized oil within oil filter apparatus 40. Note that oil filter apparatus 40 depicted in FIG. 2(b) represents a modified implementation of oil filter apparatus 10 depicted in FIGS. 1-2(a).

Figure 3:
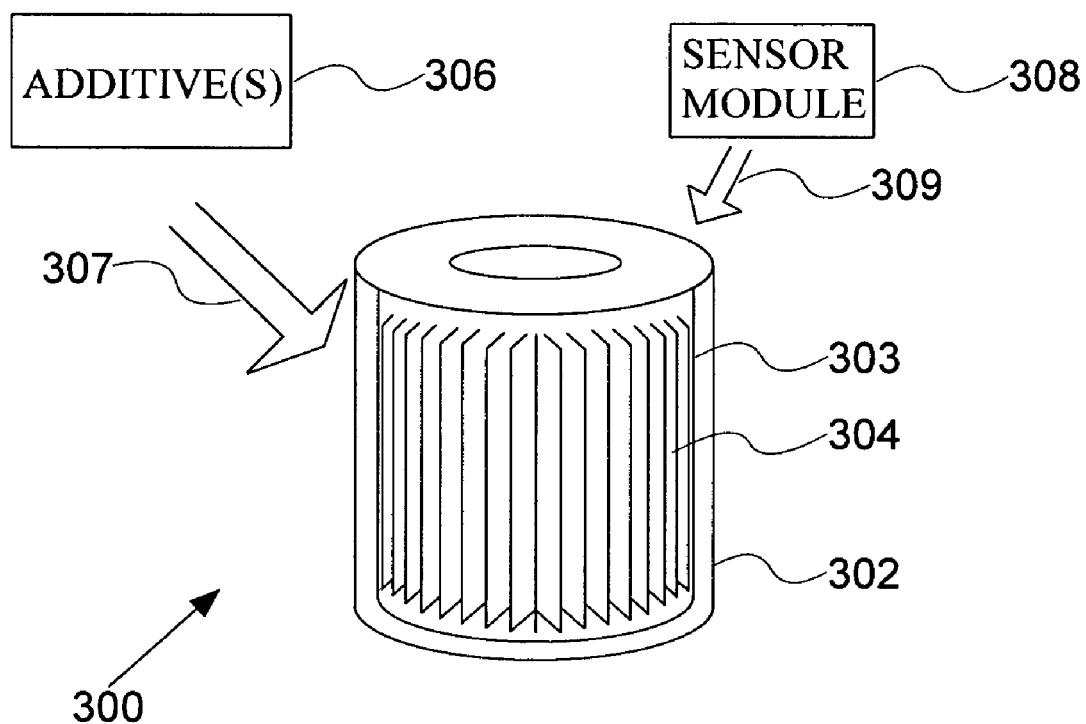
FIG. 3 illustrates pictorial diagram of an oil management system that can be implemented in accordance with one embodiment.

FIG. 3 illustrates pictorial diagram of an oil management system 300 that can be implemented in accordance with one embodiment. System 300 generally includes an oil filter container or housing 302 that maintains oil filter 303 that contains filtration media 304, which can be implemented as high-efficiency filtration media. For example filtration media 304 can be configured as nano-fiber based filtration media that possess the ability to filter particles at the sub-micron level. Thus such nano-fiber based filtration media addresses two problems. First, such media prevents soot agglomeration that leads to sludge build-up. Second, such media reduces acid built-up created by combination of high soot levels and water (e.g., inherent in diesel fuel). Filtration media 304 depicted in FIG. 3 is therefore analogous to the high-efficiency filtration media 14 depicted in FIGS. 1-2(a).

Oil filter 303 can be implemented in the context of an oil filter assembly or mechanism such as, for example, oil filter apparatus 10 depicted in FIG. 1-2. System 300 also incorporates the use of additives 306. As indicated by arrow 307, additives 306 can be impregnated into filtration media 304 and housed in a standard replacement oil filter canister or housing 302. A sensor module 308 can be embedded in the canister or housing 302. Sensor module 308 generally detects key oil condition attributes associated with oil maintained or filtered by oil filter 303.

In some implementations of the embodiments, additives 306 can be configured as time-release additives. It is important to note, however, that additive(s) 306 are not restricted to time-release or are necessarily impregnated into the filtration media. The additive(s) 306 can also be released based on need or simply released with no logic involved. The additive can be in the form of a gel, pellets, solid disks, etc. The additive can be presented to the oil similar to that shown in FIG. 2(b) herein with respect to arrows 56, 54, 52. In the particular embodiment depicted in FIG. 2(b) with respect to basket 42, the additive flows by a gel in the basket 42 on the clean side of the filter media thereof.

Figure 4:
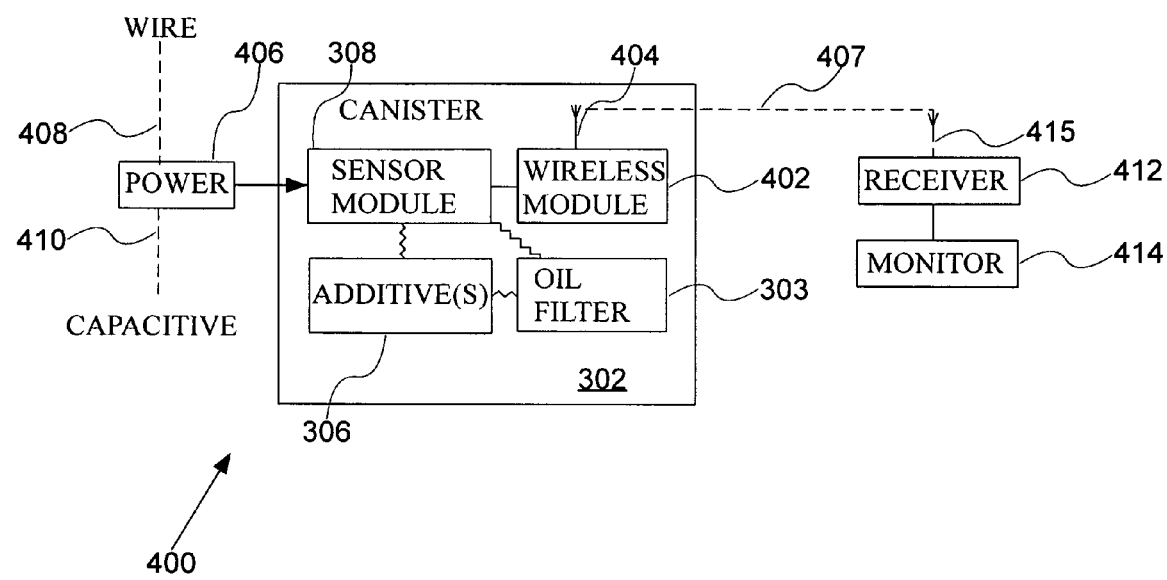
FIG. 4 illustrates a high-level block diagram of an oil management system that can be implemented in accordance with another embodiment.

FIG. 4 illustrates a high-level block diagram of an oil management system 400 that can be implemented in accordance with another embodiment. Note that in FIGS. 3-5 herein, identical or similar parts or elements are generally indicated by identical reference numerals. System 400 indicates that canister 302 can maintain sensor module 308, additives 306 and oil filter 303. Sensor module 308 can monitor oil filter 302 and identify and detect additives 306, depending upon design considerations.

It is important to note that the depletion of additives 306 can be anticipated. A solid mixture of additive chemistry can dissolve at a rate based on oil flow, time and temperature. The oil additive concentration levels are maintained throughout the oil filter 303 change intervals. The combination of very high-efficiency filtration (e.g., filtration media implemented via nano-fiber base filtration media) and stable additive concentration levels throughout the filter service interval precludes the need to change the oil in the sump. As indicated previously, such high-efficiency filtration media is preferably filtration media that is at least 95% efficient at 5 microns and above.

Depending on oil operating temperatures, small amounts of base oil oxidation may occur. A build up of oxidized oil can eventually result in sludge and reduced lubrication properties. In conventional systems, oxidized oil is removed when the oil is changed. According to the embodiments disclosed herein, however, if the oil filter 303 selectively removes oxidized oil, there is a reduced need to change the oil.

There are external variables that can adversely affect oil quality. With the oil change interval being extended by as much as an order of magnitude, according to the embodiments, it is also desirable to monitor oil quality. With appropriate sensors to monitor oil PH etch rate, metal contamination, pressure, temperature, soot loading in filter, and/or the presence of coolant or fuel, additional protection can be provided to systems 300, 400. The oil quality information can be displayed or up-linked on a real time basis utilizing monitoring device 414 disclosed in FIGS. 4 and 5.

A wireless module 402 can be connected to sensor module 308 in order to transmit data wirelessly from sensor module 308 through antenna 404, which is incorporated with wireless module 402. Power 406 to sensor module 308 can be provided as capacitive 408 or wired 410, depending upon design considerations. Sensor data can therefore be transmitted from wireless module 402 to a receiver 412 associated with an antenna 415. Wireless communications are represented in FIG. 4 by dashed line 407. A monitoring device 414 is associated with receiver 412. Both the monitoring device 414 and the receiver 412 may be located within a vehicle cabin (e.g., a car, heavy duty truck, etc.). The monitoring device 414 thus monitors data transmitted wirelessly from the sensor module 308.

Figure 5:
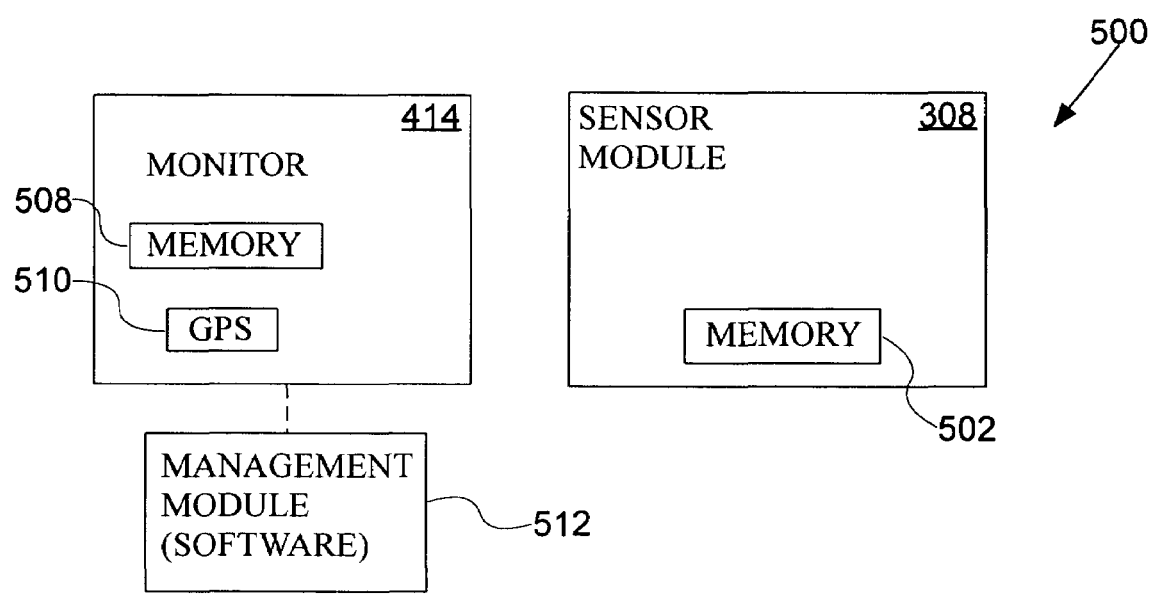
FIG. 5 illustrates a block diagram illustrating additional components of the system depicted in FIG. 4.

FIG. 5 illustrates a block diagram illustrating additional components of the system 400 depicted in FIG. 4. In FIG. 5, sensor module 308 and monitoring device 414 are depicted in greater detail. Sensor module 308 can incorporate a memory unit 502 for storing data collected by sensor module 308. Similarly, monitoring device 414 can include a memory 408 for storing data transmitted to it wirelessly (e.g., data transmitted as indicated by arrow 407 in FIG. 4).

Monitoring device 414 may also incorporate a Global Positioning System (GPS) device 510. Data stored in memory 508 has the capability of being polled or up-linked utilizing GPS techniques. Note that as utilized herein, the term Global Positioning System (GPS) generally refers to the worldwide radio-navigation system that uses the position of satellites to determine locations on the earth. The GPS is formed generally from a group or constellation of orbiting man-made satellites and their respective ground station, thereby utilizing such satellites as reference points to calculate accurate positions. Monitoring device 414 can also be associated with a management module 512 that collects sensor data input and allows for historical analysis of the oil quality data, allowing for accurate maintenance scheduling and productivity analysis for engine fleet owners. Management module 512 can be implemented as a software module, which is defined and described in greater detail herein.

Figure 6:
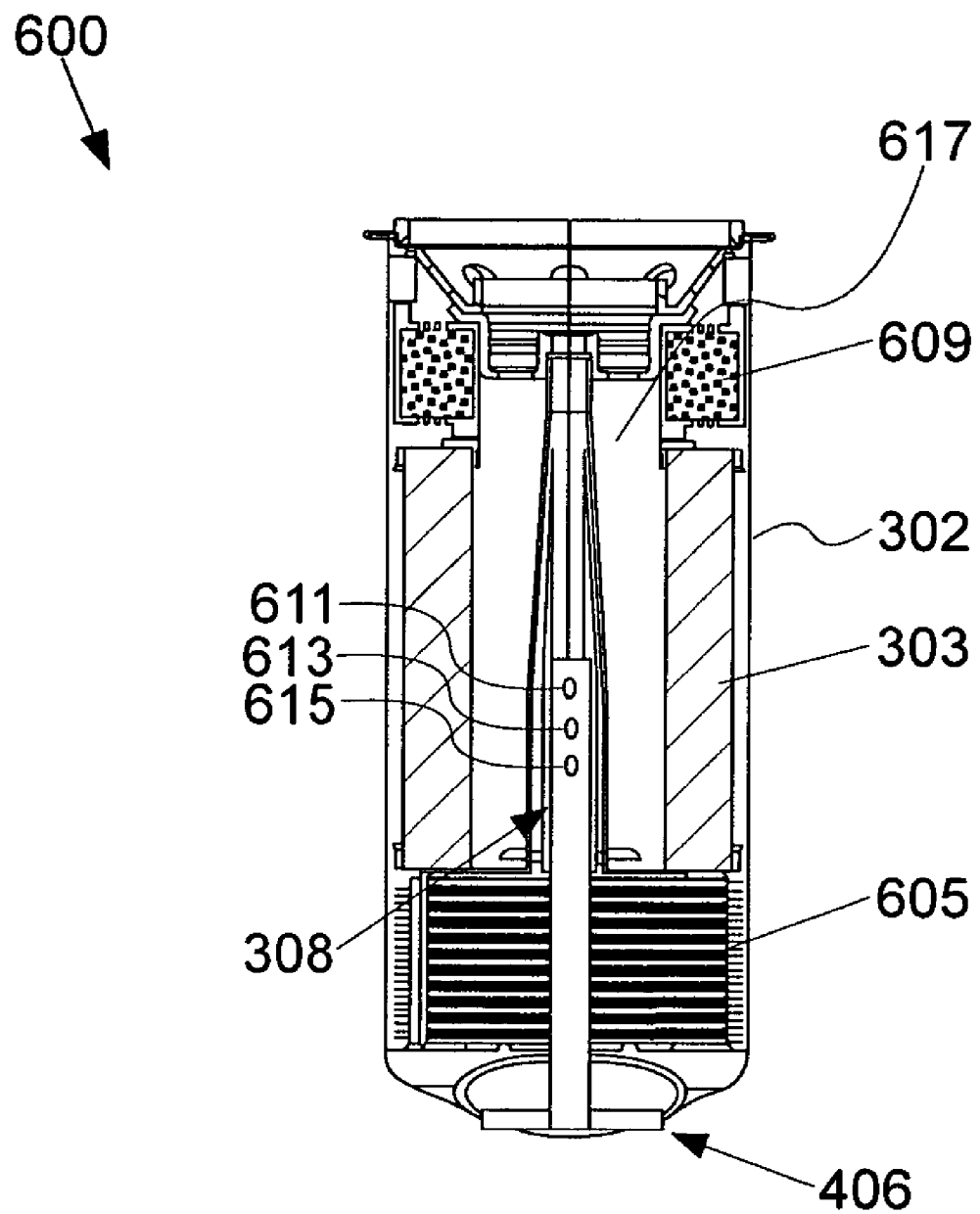
FIG. 6 illustrates a side view of an oil sensing system that can be implemented in accordance with an alternative embodiment.

FIG. 6 illustrates a side view of an oil sensing system 600 that can be implemented in accordance with an alternative embodiment. Note that in FIGS. 1-8, identical or similar parts or elements are generally indicated by identical reference numerals. Thus, systems 300-400 depicted herein can be modified in accordance with the configuration depicted in systems 600-700 as described herein. System 600 generally includes a housing or canister 302 in which filter 303 (i.e., having filter media 304) is located. Sensor module 308 can be implemented in the context of system 600 as a sensor probe with multiple transducers 611, 613, 615. A power component 406 can be implemented as a circuit board with a power supply, signal conditioning components thereof, and wireless input/output capabilities such as that of wireless module 402 and antenna 404 depicted in FIG. 4. Engine oil can flow through a central cavity 617 which is surrounded by filter 303 and filter media 304 thereof.

System 600 can also be equipped with a bypass filter 605, which can bypass, for example, approximately, 6%-10% of the total engine oil flow. A plurality of TBN pellets 609 can also be provided above the filter 303. Note that filter 303 can be configured with filter media 304 (not shown in FIG. 6) that filters, for example, approximately 90%-94% of total engine oil flow, depending upon design considerations and goals. Sensor module 308 can therefore indicate oil conditions, such as, for example, soot, alkalinity TBN, and so forth, thereby preventing the need to actually send the oil out to a third party or location for testing.

Figure 7:
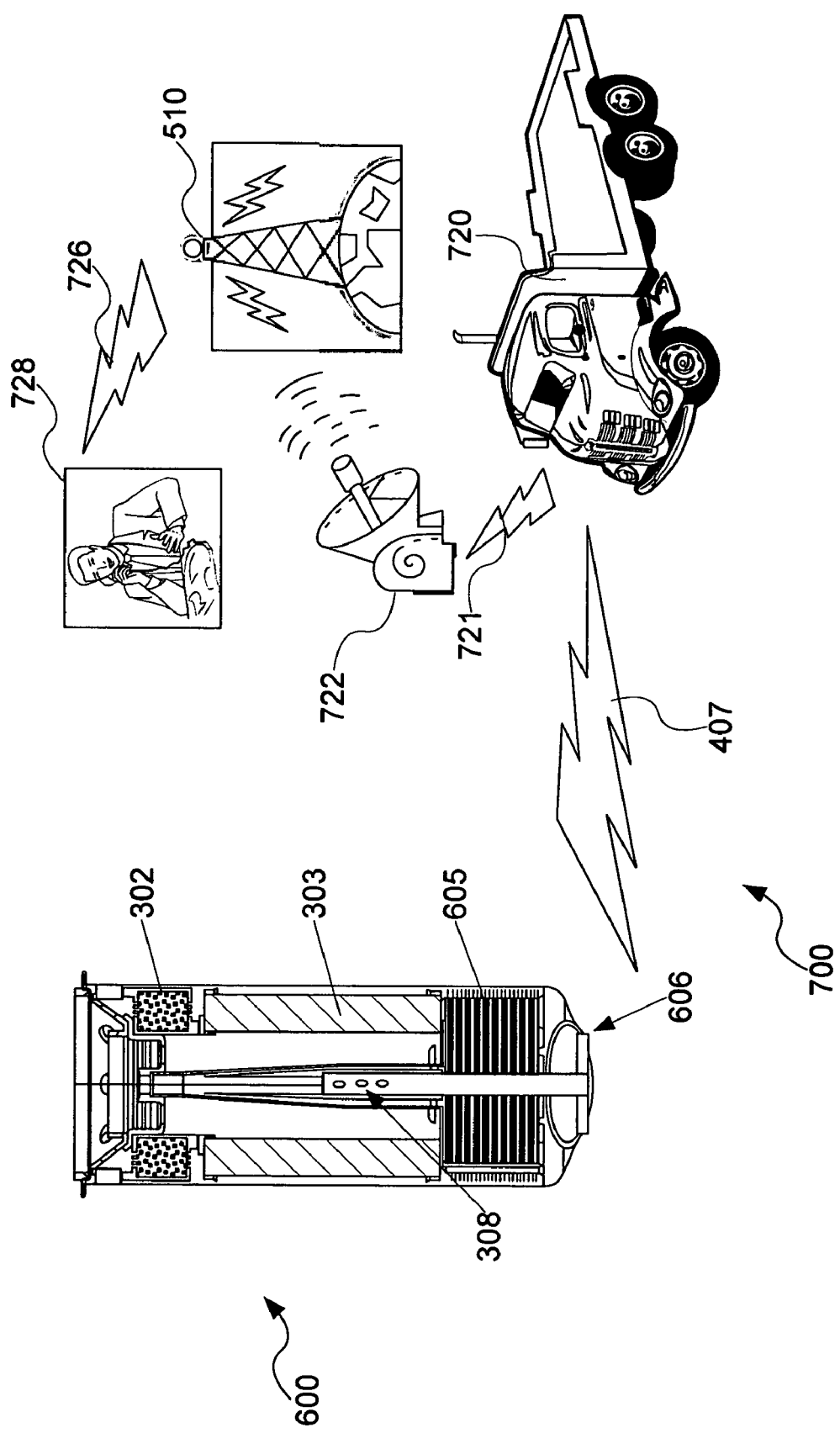
FIG. 7 illustrates a block diagram of an oil management system that can be implemented in accordance with an alternative embodiment.

FIG. 7 illustrates a block diagram of an oil management system 700 that can be implemented in accordance with an alternative embodiment. System 700 incorporates the sensing system 600 depicted in FIG. 6, such that data can be transmitted wirelessly as indicated by wireless transmissions 407, 721, and 726 depicted in FIG. 7. Data can be transmitted from system 600 to a receiver (e.g., receiver 412) located in a heavy-duty truck 720. Data from the truck 720 can then be transmitted to an antenna 722 and related via a GPS component 510 to a user 728 for further analysis and evaluation.

Figure 8:
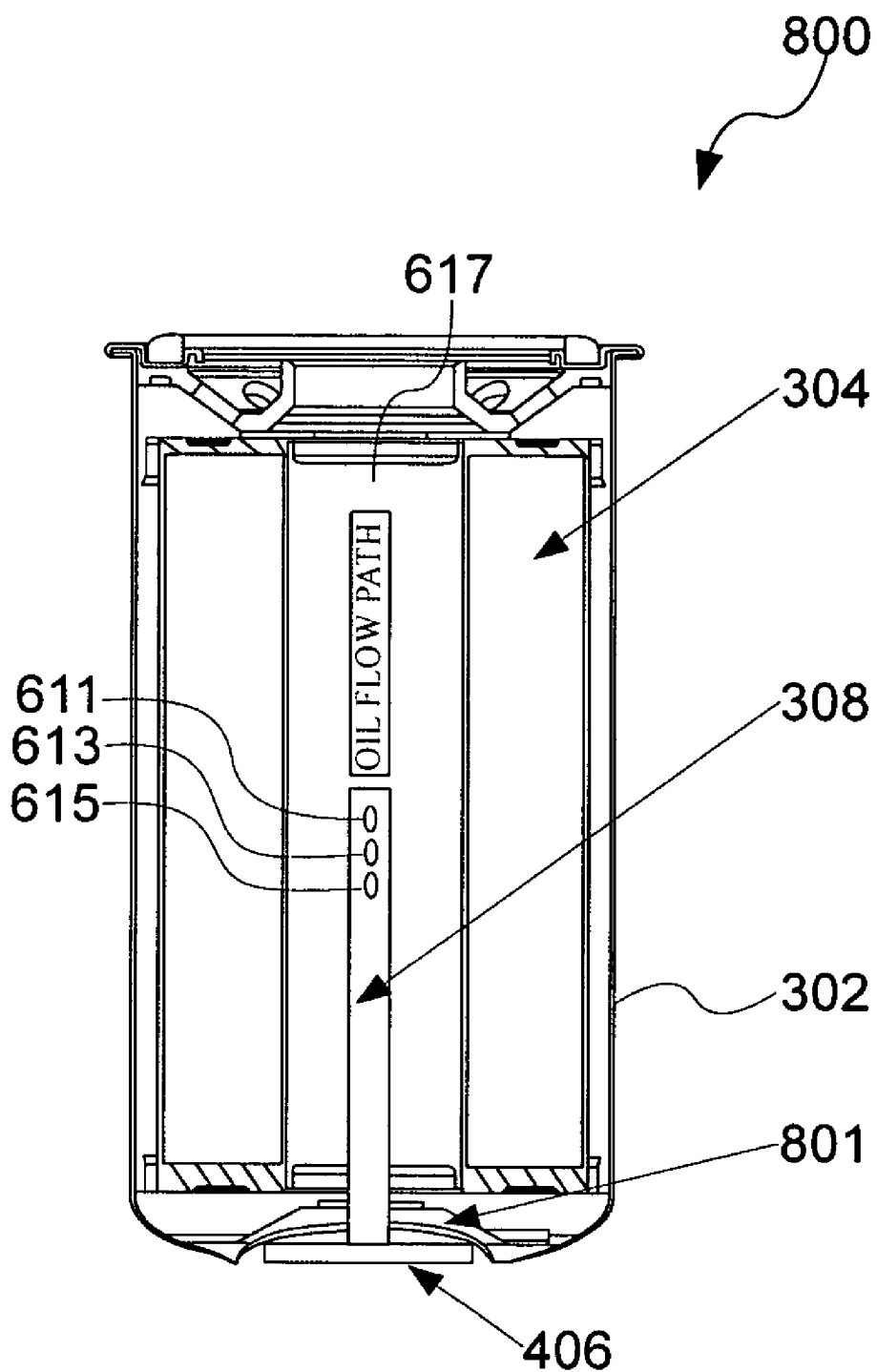
FIG. 8 illustrates a side view of an oil sensing system that can be implemented in accordance with an alternative embodiment.

FIG. 8 illustrates a side view of an oil sensing system 800 that can be implemented in accordance with an alternative embodiment. Again, it is important to note that in FIGS. 1-8, identical or similar parts or elements are generally indicated by identical reference numerals. System 800 is similar to that of system 600 and incorporates filter media 304 and additionally, an indentation 801 in the existing filter canister 302.

In general, the embodiments, such as systems 300-800 can result in the ability to extend oil change intervals through the use of an effective removal of combustion products and replenishments of oil additives (i.e., helps to protect lubricity, reduce corrosion and keep the engine clean). This demand is met through the use of high performance/selective filtration media 304 and through the use of an effective additive replenishment strategy. Depending on their size, soot particle can be captured by filter media 304. Smaller particles remain suspended in the oil.

The engine oil itself can be designed to suspend sub-micron soot particles. If soot concentrations are too high, however, the oil filter 303 can make up the difference. Extending the life of engine oil requires the capture of small soot particles. Also, oil additives are replaced on a timely basis. The base oil goes through very little, if any, degradation. As oil additives are depleted, systems 300-800 can "intelligently" refresh the oil with new additives. "Smart" filtering, along with additive replenishment, combines to extend the useful life of engine oil. It is conceivable that that the use of systems 300-800, for example, can increase oil life by a factor in a range of, for example, 4-10.

Based on the foregoing it can be appreciated that the combination of oxidized oil and soot removal, additive replenishment (e.g., on a regular basis), and real-time oil quality monitoring can successfully preclude the need for regular oil changes and the unnecessary discarding of millions of gallons of perfectly fine base oil. Such an advantage not only reduces the cost of vehicle ownership, but is also beneficial for the environment.

Note that the term "module" as utilized herein can refer to a physical hardware component (i.e., a hardware module), a software component (e.g., a software module) or a combination thereof. A software module can therefore be implemented as one or more instruction modules residing in a computer memory, such as, for example, memory units 508 and/or 502. the computer programming arts, a "module" can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, such as, for example, transmission media and/or recordable media.

Thus, sensor module 308 can be composed of a hardware component (e.g., a sensor) and/or a software component. Similarly, wireless module 402 can also be composed of a hardware component (e.g., a wireless transmitter/receiver) and/or a software component. Management module 512 depicted in FIG. 5, which is associated with monitoring module 414, is preferably implemented as a software module that can be stored in a computer memory of a data-processing system and processed utilizing a microprocessor.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An oil management system, comprising:
   an oil filter utilized in association with an internal combustion engine, wherein said oil filter comprises filtration media for filtering an engine oil associated with said internal combustion engine and is maintained by an oil filter housing;
   at least one type of additive contained in said filter housing, wherein said at least one type of additive is automatically released into said engine oil filter from said filter housing in order to replenish at least one type of additive spent in said engine oil to thereby maintain a stable concentration level of said at least one type of additive;
   a sensor module that monitors said oil filter and detects at least one attribute of said engine oil filtered through said filtration media of oil filter; and
   a management software module residing in a computer memory that collects up-linked sensor data comprising said at least one attribute from said sensor module, wherein said management software module generates a historical analysis of the quality of said engine oil for further analysis and evaluation by a user in order to efficiently conserve and manage said oil and reduce the interval of oil changes thereof by extending the life of said engine oil through the replenishment of said additives present in said engine oil.

2. The system of claim 1 wherein said sensor module is located within said oil filter housing and includes a memory unit for storing said sensor data.

3. The system of claim 1 wherein said sensor module is mounted separately from said oil filter housing.

4. The system of claim 1 wherein said sensor module continuously monitors said engine oil in order to indicate a quality of said engine oil and an effectiveness of said at least one additive and said oil filter.

5. The system of claim 1 wherein said sensor module polls said engine oil in order to indicate a quality of said engine oil and an effectiveness of said at least one additive and said oil filter.

6. The system of claim 1 wherein said sensor module periodically monitors said engine oil in order to indicate a need to change said oil filter.

7. The system of claim 1 wherein said filtration media comprises high-efficiency filtration media that is at least 95% efficient at a value greater than or equal to at least 5 microns.

8. The system of claim 7 wherein said high-efficiency filtration media comprises nano-fiber based filtration media.

9. The system of claim 1 wherein power to said sensor module is capacitive-based.

10. The system of claim 1 wherein power to said sensor module is wired-based.

11. The system of claim 2 further comprising a wireless module associated with and in communication with said sensor module that permits said sensor data compiled by said sensor module and stored in said memory unit to be transmitted wirelessly to a receiver.

12. An oil management system, comprising:
    an oil filter utilized in association with an internal combustion engine, wherein said oil filter comprises filtration media for filtering an engine oil associated with said internal combustion engine and is maintained by an oil filter housing:
    at least one type of additive contained in said filter housing, wherein said at least one type of additive is automatically released into said engine oil filter from said filter housing in order to replenish at least one type of additive spent in said engine oil to thereby maintain a stable concentration level of said at least one type of additive;
    a sensor module that monitors said oil filter and detects at least one attribute of said engine oil filtered through said filtration media of oil filter, wherein said sensor module is located within said oil filter housing and includes a memory unit for storing said sensor data:
    a management software module residing in a computer memory that collects up-linked sensor data comprising said at least one attribute from said sensor module, wherein said management software module generates a historical analysis of the quality of said engine oil for further analysis and evaluation by a user in order to efficiently conserve and manage said oil and reduce the interval of oil changes thereof by extending the life of said engine oil through the replenishment of said additives present in said engine oil;
    a wireless module associated with and in communication with said sensor module that permits said sensor data compiled by said sensor module and stored in said memory unit to be transmitted wirelessly to a receiver; and
    a monitoring device that monitors data transmitted wirelessly from said wireless module and up links said sensor data to said management software module, wherein said monitoring device is associated with said receiver and comprises a second memory unit for maintaining said sensor data transmitted wirelessly from said sensor module.

13. The system of claim 12 further comprising a GPS device associated with said monitoring device, wherein said GPS device permits said sensor data stored within said second memory unit to be polled or up-linked.

14. The system of claim 1 wherein said sensor data is indicative of a quality of said engine oil by detecting at least one of the following attributes of said engine oil; oil PH etch rate, metal contamination, pressure, temperature, soot loading in said oil filter, and a presence of coolant or fuel, thereby allowing for accurate maintenance scheduling and productivity analysis for engine fleet owners thereof.

15. An oil management system, comprising:

an oil filter utilized in association with an internal combustion engine, wherein said oil filter comprises high-efficiency filtration media that is at least 95% efficient at a value greater than or equal to at least 5 microns for filtering an engine oil associated with said internal combustion engine and is maintained by an oil filter housing;

at least one type of additive impregnated in said filter housing, wherein said at least one type of additive is automatically released into said engine oil filter from said filter housing in order to replenish at least one type of additive spent in said engine oil to thereby maintain a stable concentration level of said at least one type of additive;

a sensor module that monitors said oil filter and detects at least one attribute of said engine oil filtered through said high-efficiency filtration media of oil filter in order to efficiently conserve and manage said oil and reduce the interval of oil changes thereof by extending the life of said engine oil through the replenishment of said additives present in said engine oil;

a wireless module associated with and in communication with said sensor module that permits sensor data compiled by said sensor module to be transmitted wirelessly to a receiver;

a monitoring device that monitors data transmitted wirelessly from said sensor module, wherein said monitoring device is associated with said receiver and comprises a memory for maintaining said data transmitted wirelessly from said sensor module; and a management software module residing in a computer memory that collects sensor data up-linked from said monitoring device, wherein said sensor data is indicative of a quality of said engine oil and wherein said management module generates a historical analysis of the quality of said engine oil for further analysis and evaluation by a user, thereby allowing for accurate maintenance scheduling and productivity analysis for engine fleet owners thereof.

16. An oil management method, comprising configuring an oil filter utilized in association with an internal combustion engine to comprise filtration media for filtering an engine oil associated with said internal combustion engine;

maintaining said oil filter by an oil filter housing;

containing at least one type of additive in said filter housing, wherein said at least one type of additive is automatically released into said engine oil filter from said filter housing in order to replenish at least one type of additive spent in said engine oil to thereby maintain a stable concentration level of said at least one type of additive;

monitoring said oil filter in order to detect at least one attribute of said engine oil filtered through said filtration media of oil filter; and managing said at least one attribute detected therein by a management software module residing in a computer memory in order to generate an historical analysis for further analysis and evaluation by a user to thereby efficiently conserve and manage said oil and reduce the interval of oil changes thereof by extending the life of said engine oil through the replenishment of said additives present in said engine oil.

17. The method of claim 16 wherein said filtration media comprises high-efficiency filtration media that is at least 95% efficient at a value greater than or equal to at least 5 microns.

18. The system of claim 17 wherein said high-efficiency filtration media comprises nano-fiber based filtration media.

* * * * *